United States Patent
Lee et al.

(10) Patent No.: US 10,106,678 B2
(45) Date of Patent: Oct. 23, 2018

(54) ACRYLIC PROCESSING AID AND VINYL CHLORIDE RESIN COMPOSITION COMPRISING THE SAME

(71) Applicant: LG Chem, Ltd., Seoul (KR)

(72) Inventors: Kwang Jin Lee, Daejeon (KR); Geon Soo Kim, Daejeon (KR); Yoon Ho Kim, Daejeon (KR); Kyung Bok Sun, Daejeon (KR)

(73) Assignee: LG Chem, Ltd. (KR)

( * ) Notice: Subject to any disclaimer, the term of this patent is extended or adjusted under 35 U.S.C. 154(b) by 15 days.

(21) Appl. No.: 15/467,021

(22) Filed: Mar. 23, 2017

(65) Prior Publication Data

US 2017/0355843 A1 Dec. 14, 2017

(30) Foreign Application Priority Data

Jun. 14, 2016 (KR) .................. 10-2016-0073733
Feb. 28, 2017 (KR) .................. 10-2017-0026487

(51) Int. Cl.
| C08L 27/06 | (2006.01) |
| C08F 283/12 | (2006.01) |
| C08F 257/02 | (2006.01) |
| C08L 51/08 | (2006.01) |
| C08F 285/00 | (2006.01) |
| C08G 77/20 | (2006.01) |

(52) U.S. Cl.
CPC ............ C08L 27/06 (2013.01); C08F 257/02 (2013.01); C08F 283/124 (2013.01); C08F 285/00 (2013.01); C08L 51/085 (2013.01); C08G 77/20 (2013.01); C08L 2205/06 (2013.01); C08L 2207/53 (2013.01)

(58) Field of Classification Search
CPC ..... C08L 51/085; C08L 27/06; C08L 2207/53
See application file for complete search history.

(56) References Cited

U.S. PATENT DOCUMENTS

| 4,111,876 A | 9/1978 | Bailey et al. |
| 4,172,101 A * | 10/1979 | Getson .................. C08L 43/04 525/101 |
| 5,221,713 A | 6/1993 | Kempner et al. |
| 6,140,417 A | 10/2000 | Nakanishi et al. |
| 6,221,966 B1 | 4/2001 | Nakanishi et al. |
| 6,391,976 B1 | 5/2002 | Naka et al. |
| 6,723,762 B1 | 4/2004 | Sunagawa et al. |
| 2002/0165311 A1 | 11/2002 | Iguchi et al. |
| 2003/0027881 A1 | 2/2003 | Sunagawa et al. |
| 2004/0116580 A1 | 6/2004 | Sakashita et al. |
| 2006/0148946 A1 * | 7/2006 | Lee et al. .............. C08F 285/00 524/268 |
| 2007/0100073 A1 | 5/2007 | Lee et al. |
| 2014/0107276 A1 | 4/2014 | Kim et al. |
| 2016/0304651 A1 | 10/2016 | Han et al. |

FOREIGN PATENT DOCUMENTS

| CN | 101418065 A | 4/2009 |
| EP | 1045004 A1 | 10/2000 |
| JP | H05247313 A | 9/1993 |
| JP | 2001089592 A | 4/2001 |
| JP | 2004509987 A | 4/2004 |
| JP | 3631360 B2 | 3/2005 |
| JP | 2014516104 A | 7/2014 |
| JP | 2014530957 A | 11/2014 |
| KR | 100566342 B1 | 3/2006 |
| KR | 100581428 B1 | 5/2006 |
| KR | 100639084 B1 | 10/2006 |
| KR | 100836731 B1 | 6/2008 |
| KR | 20110040510 A | 4/2011 |
| WO | 0012621 A1 | 3/2000 |
| WO | 0224760 A2 | 3/2002 |
| WO | 2007043788 A1 | 4/2007 |

* cited by examiner

Primary Examiner — Marc S Zimmer

(74) Attorney, Agent, or Firm — Lerner, David, Littenberg, Krumholz & Mentlik, LLP

(57) ABSTRACT

The present invention relates to an acrylic processing aid and a vinyl chloride resin composition comprising the same. Specifically, the present invention relates to a core-shell structured acrylic processing aid which can play both roles as a lubricant and a processing aid at the same time by using monomers having a certain composition for the core and shell, respectively, and controlling their specific viscosity, and to a vinyl chloride resin composition comprising the same.

14 Claims, No Drawings

ACRYLIC PROCESSING AID AND VINYL CHLORIDE RESIN COMPOSITION COMPRISING THE SAME

This application claims the benefit of Korean Application Nos. 10-2016-0073733 filed on Jun. 14, 2016 and 10-2017-0026487 filed on Feb. 28, 2017, all of which are herein incorporated by reference in their entirety.

BACKGROUND OF THE INVENTION

1. Field of the Invention

The present invention relates to an acrylic processing aid capable of simultaneously performing the roles as a lubricant and a processing aid, and a vinyl chloride resin composition comprising the same.

2. Description of the Related Art

Vinyl chloride resins are homopolymers of vinyl chloride or copolymers containing 50% or more of vinyl chloride. These vinyl chloride resins are widely used as materials in various fields such as wire, electromechanical product, toy, film, sheet, synthetic leather, tarpaulin, tape, food wrapping material and medical supply through various processing methods including foam molding, extrusion molding, injection molding, calendaring, and the like.

Vinyl chloride resins show excellent hardness and tensile strength. Additionally, a variety of additives, for example, plasticizer, stabilizer, filler, pigment, and the like may be added thereto for imparting other various physical properties and functions than the above, whereby broadening their field of application more and more.

Besides the above method of adding some additives, it is also possible to broaden the field of application of vinyl chloride resins through the change of processing process. For example, if the vinyl chloride resins are foam-molded, the weight reduction of molded product can be achieved and the production cost can be reduced. However, if a product is obtained by foam molding of vinyl chloride resins alone, it cannot have sufficient elongation and melt strength so that the molded product has poor appearance, and also has a low foaming magnitude due to the large and non-uniform foam cells. In order to solve these problems, a method of adding a mixture of a processing aid and a foaming agent to a vinyl chloride resin has been widely researched.

As a typical processing aid, a high molecular weight acrylate processing aid having methyl methacrylate as the main ingredient has been mixed with a foaming agent to be added to a vinyl chloride resin.

As an example thereof, U.S. Pat. No. 6,391,976 (Title: "Processing aid for foam molding use and vinyl chloride resin composition containing the same") discloses a method of using an acrylate monomer as a comonomer of methyl methacrylate, and U.S. Pat. No. 6,221,966 (Title: "Vinyl chloride resin composition") provides a method of polymerizing methyl methacrylate with a latex prepared from the polymerization using an alkyl acrylate as the main monomer.

As the molecular weight of acrylic processing aid increases, however, processability and dispersity thereof are deteriorated due to its high viscosity, whereby giving some defects such as die mark, flow mark, fish eye (or a melt globule not dispersed), etc. on the surface of the finally obtained molded product or causing the problem of large difference of specific gravity depending on the site of the molded product.

SUMMARY OF THE INVENTION

Thus, the present inventors have researched in a variety of ways to solve the above stated problems. As a result, they have identified that if an acrylate processing aid is prepared by designing a new core composition to enable the role as a lubricant and designing a new shell composition to enable the role as a processing aid and then it is applied to a vinyl chloride resin, the slip property of lubricant is enhanced while preventing adhesion and allowing improvement of foamability and formability of the processing aid at the same time.

It is an object of the present invention to provide an acrylic processing aid capable of simultaneously performing the roles as a lubricant and a processing aid during the foaming process of vinyl chloride resins.

It is another object of the present invention to provide a method of preparing said acrylic processing aid.

It is still another object of the present invention to provide a vinyl chloride resin composition comprising said acrylic processing aid.

In order to achieve the above stated objects, the present invention provides an acrylic processing aid comprising a core-shell structured acrylic latex wherein the core comprises a copolymer of an aromatic monomer, a C2-C18 alkyl acrylate monomer and a vinyl-terminated polydimethylsiloxane and wherein the shell is grafted with said core and comprises a copolymer of methyl methacrylate, a C2-C18 alkyl acrylate monomer and a neopentyl glycol alkoxylate diacrylate.

Said core is characterized by having the specific viscosity ($\eta_{sp}$) of 0.5 to 2.0 and said shell is characterized by having the specific viscosity of 2 to 8.

Also, the present invention provides a method of preparing the acrylic processing aid, which comprises the steps of
copolymerizing an aromatic monomer, a C2-C18 alkyl acrylate monomer and a vinyl-terminated polydimethylsiloxane to prepare a core; and
adding methyl methacrylate, a C2-C18 alkyl acrylate monomer and a neopentyl glycol alkoxylate diacrylate to the core and carrying out graft polymerization to prepare a shell.

Furthermore, the present invention provides a vinyl chloride resin composition comprising the acrylic processing aid.

The acrylic processing aid according to the present invention is capable of simultaneously performing the roles as a lubricant and a processing aid. Thus, it can be added in preparing a molded product of vinyl chloride resins through the foam molding to control the extrusion output during the processing step, to improve the surface characteristics of the finally obtained molded product, and to lower the globule development and adhesion while enhancing the processability.

Also, as the foam processability is enhanced, cells are formed with a uniform specific gravity throughout the molded product to enable the manufacture of a molded product of vinyl chloride resins having a high quality.

DETAILED DESCRIPTION OF THE INVENTION

Foam molding is carried out by adding a vinyl chloride resin and an acrylic processing aid to a mold and then using a foaming agent or applying a pressure. The processing aid plays a role of facilitating the gelation of the vinyl chloride resin and improving formability and processability. It also plays a role of providing excellent foaming magnitude and stability of foam cells in the foaming process.

In the present invention, the acrylic processing aid is prepared in a core-shell structure wherein each of the core and shell is prepared by copolymerization of monomers having specific composition. The specific viscosity ($\eta_{sp}$) of each of the core and shell is controlled whereby they play a role as a processing aid even without highly increasing the molecular weight and at the same time they show the effect which can be obtained by using a typical lubricant.

The lubricant is used in the forming process of a vinyl chloride resin to prevent the adhesion by lubricating the metal surface in contact with the resin and to enhance the flowability. Due to the use of lubricant, the processing temperature is lowered and the processing time is shortened and at the same time the surface characteristics of the molded product is improved.

In order to secure both of the roles as a processing aid and a lubricant at the same time, the present invention has the feature that the processing aid is prepared in a core-shell structure wherein the core comprises a copolymer of a vinyl-terminated polydimethylsiloxane so as to act as a lubricant and the shell comprises a copolymer of a neopentyl glycol alkoxylate diacrylate so as to act as a processing aid.

Specifically, the vinyl-terminated polydimethylsiloxane added to the core improves the processability, lowers the adhesion, and enhances the slip property of the resin during the processing of a vinyl chloride resin, whereby performing a role as a lubricant to solve the problem of surface defects such as die mark, flow mark, fish eye (or a melt globule not dispersed), etc. on the surface of the finally obtained molded product. Also, the neopentyl glycol alkoxylate diacrylate added to the shell facilitates the melting, controls the foam specific gravity, and enhances the cell uniformity during the processing of a vinyl chloride resin, whereby enabling the role as a processing aid.

Hereinafter, each compositions of the core-shell structured processing aid proposed by the present invention are explained more in detail.

Specifically, the core comprises a copolymer of an aromatic monomer, a C2-C18 alkyl acrylate monomer and a vinyl-terminated polydimethylsiloxane.

The aromatic monomer may be one selected from the group consisting of styrene, alpha-methyl styrene, isopropenyl naphthalene, vinyl naphthalene, C1-C3 alkyl-substituted styrene, halogen-substituted styrene and combinations thereof.

Such an aromatic monomer is used in the amount of 30 to 70% by weight, preferably 40 to 65% by weight based on 100% by weight of the total monomers forming the core. If the content is out of the above ranges, the overall physical properties including the processability and formability of the vinyl chloride resin may be deteriorated.

The C2-C18 alkyl acrylate may be one selected from the group consisting of ethyl acrylate, propyl acrylate, butyl acrylate, 2-ethylhexyl acrylate, stearyl acrylate and combinations thereof, preferably butyl acrylate. Here, the monomer represented by C2-C18 alkyl acrylate may be used in the same type as or different from each other in the preparation of core and shell.

The C2-C18 alkyl acrylate monomer is used in the amount of 20 to 65% by weight, preferably 26 to 50% by weight based on 100% by weight of the total monomers forming the core. If the content is out of the above ranges, the overall physical properties including the processability and formability of the vinyl chloride resin may be deteriorated.

In particular, the core of acrylic processing aid proposed by the present invention comprises a vinyl-terminated polydimethylsiloxane represented by the following formula 1:

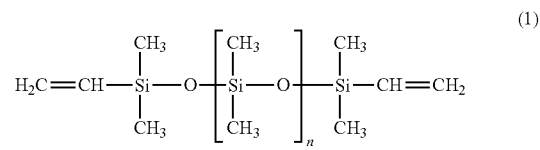

(In the above formula 1, n is an integer of 1 to 100.)

If the vinyl-terminated polydimethylsiloxane of formula 1 is added, the melt viscosity of the vinyl chloride resin is lowered to improve its molding processability, to prevent the adhesion between the mold and the resin and to improve the slip property (property of sliding right and left), whereby it plays the role as a lubricant. Furthermore, the surface characteristics of the finally obtained molded product of vinyl chloride resin is improved to reduce such surface defects as die mark, flow mark, fish eye, etc. on the molded product. In addition, the mixing ability of the overall vinyl chloride resins is improved, whereby enabling the molding to impart uniform specific gravity to the overall molded product.

In order to secure such an effect, the vinyl-terminated polydimethylsiloxane is controlled to have certain molecular weight and content.

Preferably, for the function as the above stated lubricant, the vinyl-terminated polydimethylsiloxane having the weight average molecular weight of 200 to 250,000 g/mol, preferably 500 to 50,000 g/mol may be used. Also, it may be used in the content of 0.01 to 10% by weight, preferably 0.05 to 3% by weight in 100% by weight of the total monomers forming the core. If the molecular weight and content are out of the above ranges, it cannot act as a lubricant, whereby the overall physical properties may be deteriorated to decline the processability and surface characteristics of the vinyl chloride resin. Thus, they are appropriately selected to meet the above stated ranges.

On the other hand, the shell of the acrylic processing aid according to the present invention is to provide the function as a processing aid, in other words, excellent foaming characteristics. It includes a copolymer of methyl methacrylate, a C2-C18 alkyl acrylate monomer and particularly neopentyl glycol alkoxylate diacrylate.

The neopentyl glycol alkoxylate diacrylate is represented by the following formula 2:

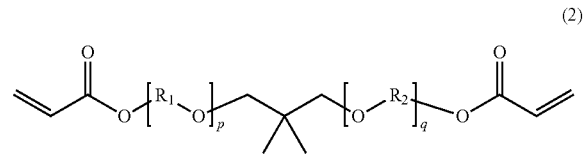

(In the above formula 2, $R_1$ and $R_2$ are the same as or different from each other and each are a C1-C4 alkylene group, and p+q is 2 to 5.)

Preferably, the neopentyl glycol alkoxylate diacrylate may be neopentyl glycol ethoxylate diacrylate, neopentyl glycol propoxylate diacrylate, or neopentyl glycol butoxylate diacrylate, preferably neopentyl glycol propoxylate diacrylate.

The neopentyl glycol alkoxylate diacrylate has double bonds at both ends so that it may be grafted with the core to form a shell. It also facilitates the melting of vinyl chloride resin whereby acting such roles as shortening the processing time, improving the melt flowability and increasing the extrusion output. Thus, it is used to form a shell through the copolymerization with other monomers whereby acting as a processing aid, i.e., improving the processability, controlling the foam specific gravity and at the same time forming the cells uniformly in the molded product.

Preferably, for acting as the above stated processing aid, the neopentyl glycol alkoxylate diacrylate having the weight average molecular weight of 200 to 10,000 g/mol, preferably 250 to 8,000 g/mol may be used. Also, it may be used in the content of 0.01 to 10% by weight, preferably 0.5 to 7.0% by weight in 100% by weight of the total monomers forming the shell. If the molecular weight and content are out of the above ranges, it cannot act as a processing aid, whereby the overall physical properties may be deteriorated to decline the processability, formability and foaming characteristics of the vinyl chloride resin. Thus, they are appropriately selected to meet the above stated ranges.

The other monomers constituting the shell along with the neopentyl glycol alkoxylate diacrylate include 45 to 90% by weight of methyl methacrylate and 1 to 50% by weight of C2-C18 alkyl acrylate monomer. Here, the alkyl acrylate is as explained in the core above.

When the contents of methyl methacrylate and alkyl acrylate are out of the above ranges, the overall physical properties may be deteriorated to decline the processability and formability of the vinyl chloride resin. If the content of methyl methacrylate is out of the above range, the overall physical properties may be deteriorated to decline the processability and formability of the vinyl chloride resin. Also, if the content of C2-C18 alkyl acrylate is below the above range, the shortening of melting time and the reduction of generation of non-gelled product, which are effected by the use of a processing aid, can hardly be expected. On the contrary, if the content exceeds the above range, the melt pressure may be reduced to decline the processability, to increase the foam specific gravity and to decline the cell uniformity, whereby deteriorating the foamability.

On the other hand, the core-shell structured acrylic processing aid of the present invention is prepared to have the above limited composition and also to have the core and shell each of which has a particular specific viscosity. Here, the specific viscosity means the specific viscosity of the copolymers constituting each of the core and shell.

The specific viscosity ($\eta_{sp}$) is one of the expressions about polymer viscosity. It is a value for measuring the polymer viscosity in the state of a solution and is defined as a difference between the efflux time of pure solvent ($t_0$) and the efflux time of polymer solution (t) divided by the efflux time of pure solvent ($t_0$).

$$\frac{t - t_0}{t_0} = \eta_{sp}$$

(In the above equation, t means the efflux time of polymer solution, and $t_0$ means the efflux time of pure solvent.)

The high specific viscosity causes the long efflux time, which means the high molecular weight of polymer. On the contrary, the low specific viscosity causes the short efflux time, which means the low molecular weight of polymer.

In the present invention, the core is prepared to have the specific viscosity range of 0.5 to 2, preferably 1.2 to 1.8, whereby the functions as a lubricant, i.e., the processability and surface characteristics can be secured. If the specific viscosity value is out of the range, there may be such problems that the processability is declined and some defects are found on the surface of the finally obtained molded product. Thus, the value is appropriately selected to meet the above stated range.

Also, the shell is prepared to have the specific viscosity range of 2 to 8, preferably 3.0 to 6.0, whereby the functions as a processing aid, i.e., processability, formability and foaming characteristics being improved. If the specific viscosity value is out of the range, the foam specific gravity is not easily controlled and the extrusion output is decreased so that the above proposed effect cannot be secured.

Furthermore, the core-shell structured acrylic processing aid according to the present invention comprises 5 to 50% by weight of core and 50 to 95% by weight of shell based on 100% by weight of the total monomers of the core and shell. Such ranges enable the above stated effects required for each of the core and shell, that is, the functions as a lubricant and a processing aid at the same time. If the content is out the range, the above effect cannot be secured.

The core-shell structured acrylic latex as explained above may be prepared through a two-step polymerization.

Specifically, the acrylic processing aid is prepared by the steps of mixing an aromatic monomer, a C2-C18 alkyl acrylate and a vinyl-terminated polydimethylsiloxane and carrying out polymerization thereof to prepare a core; and mixing the core with methyl methacrylate, a C2-C18 alkyl acrylate and a neopentyl glycol alkoxylate diacrylate and carrying out polymerization thereof to give a core-shell structured acrylic processing aid.

Hereinafter, each step is explained.

First, an aromatic monomer, the C2 to C18 alkyl acrylate and the vinyl-terminated polydimethylsiloxane are mixed and then subjected to emulsion polymerization to prepare the core.

The various components required for the emulsion polymerization and the reaction conditions are not specifically limited in the present invention, and may follow those known in the art.

The initiator may include a water soluble initiator, for example, inorganic peroxides such as sodium persulfate, potassium persulfate, ammonium persulfate, potassium superphosphate, hydrogen peroxide, etc.; organic peroxides such as potassium peroxide, t-butyl peroxide, cumene hydroperoxide, p-menthane hydroperoxide, di-t-butyl peroxide, t-butyl cumyl peroxide, acetyl peroxide, isobutyl peroxide, octanoyl peroxide, dibenzoyl peroxide, 3,5,5-trimethylhexanol peroxide, t-butyl peroxy-isobutyrate, etc.; nitrogen compounds such as azobis isobutyronitrile, azobis-2,4-dimethylvaleronitrile, azobis-cyclohexane carbonitrile, azobis iso-butyric acid methyl, etc. These initiators are used in the amount of 0.03-0.2 part by weight per 100 parts by weight of the total monomers.

The polymerization may be performed at 40~80° C. for 2~12 hours.

According to one embodiment of the present invention, some additives typically known in the art such as a redox catalyst, a polymerization initiator, an emulsifier (or surfactant), a molecular weight controlling agent, an activator, deionized water, etc. may be further included in the emulsion polymerization.

The molecular weight controlling agent includes, but are not limited to, for example, α-methyl styrene dimer; mercaptans such as t-dodecyl mercaptan, n-dodecyl mercaptan, octyl mercaptan, etc.; halogenated hydrocarbons such as carbon tetrachloride, methylene chloride, methyl bromide, etc.; sulfur-containing compounds such as tetraethyl thiuram disulfide, dipentamethylene thiuram disulfide, diisopropyl xanthogen disulfide, etc. It may be used in the amount of 0.1 to 3 parts by weight per 100 parts by weight of the monomer mixture.

The activator may include, but not limited to, sodium hydrosulfite, sodium formaldehyde sulfoxylate, sodium ethylene diamine tetraacetate, ferrous sulfate, lactose, dextrose, sodium linolenate and sodium sulfate, one or more selected from which may be added within the range of 0.01 to 0.15 part by weight based on 100 parts by weight of the total monomers at each step.

The redox catalyst may include, but not limited to, sodium formaldehyde sulfoxylate, ferrous sulfate, disodium ethylene diamine tetraacetate, cupric sulfate, etc., which may be used in the amount of 0.01 to 0.1 parts by weight based on 100 parts by weight of the monomer mixture.

Then, for preparing the shell, methyl methacrylate, a C2-C18 alkyl acrylate and a neopentyl glycol alkoxylate diacrylate are added to the core and the mixture is subjected to emulsion polymerization to give the core-shell structured acrylic latex.

The emulsion polymerization for preparing the shell is carried out in the same manner as explained above.

In addition, the acrylic processing aid may be coagulated using the typical acid, salt or polymer coagulant, dehydrated and dried to give a powder which is then used for the foam molding of vinyl chloride resin.

The presently claimed acrylic processing aid is used as a processing aid in the foam molding of vinyl chloride resin while simultaneously acting as a lubricant and a processing aid. Thereby the surface defect of the finally obtained molded product is improved, the foam cells are uniformly formed, and it is possible to prepare a product having a uniform specific gravity across the molded product.

Specifically, the acrylic processing aid according to the present invention is added in the amount of 0.1 to 30 parts by weight based on 100 parts by weight of the vinyl chloride resin to manufacture various molded products through foam molding.

If the content of acrylic processing aid is below the above range, the processability, formability and thermal stability even after the use of processing aid are declined to deteriorate the quality of molded product. On the contrary, if the content exceeds the above range, the processability is declined and furthermore a variety of mechanical and chemical properties are rather declined. Thus, the content is appropriately selected to meet the above stated range.

Here, if necessary, various additives which are typically used in the art may be further added. The additives may include the typical ones such as thermal stabilizer, lubricant, impact modifier, plasticizer, UV stabilizer, flame retardant, colorant, antibacterial agent, release agent, antioxidant, photostabilizer, compatibilizer, dye, inorganic additive, surfactant, nucleating agent, coupling agent, filler, admixing agent, stabilizer, antistatic agent, pigment, resistant, etc., which may be applied alone or as a mixture of two or more thereof.

The method of foam molding using the vinyl chloride resin composition is not specifically limited in the present invention and may follow those known in the art.

The molded product obtained by foam molding shows the improved foaming magnitude at the foaming process and stability of foam cell to give a foam having a low specific gravity of 0.4 to 0.5 g/cm$^3$ and uniform foam cells.

Hereinafter, some preferable examples are provided for better understanding of the present invention. However, the following examples are only for illustrating the present invention, but may be changed or modified in various ways within the scope and technical concept of the present invention as apparent for those skilled in the art. It is also reasonable that such changes and modifications fall under the appended claims.

Example 1: Preparation of Acrylic Processing Aid (Step 1) Preparation of Core

First, a 4-neck flask reactor equipped with a stirrer, a thermometer, a nitrogen inlet, and a circulating condenser was prepared. 100 parts by weight of deionized water (DDI water), 0.002 part by weight of ferrous sulfate, 0.04 part by weight of disodium ethylene diamine tetraacetate were introduced thereto. The internal temperature of the reactor was maintained at 70° C. under nitrogen atmosphere.

In order to prepare a monomer pre-emulsion, 70 parts by weight of deionized water, 0.50 part by weight of an emulsifier (sodium dodecylbenzene sulfonate; SDBS), 25 parts by weight of styrene (SM), 14.6 parts by weight of butylacrylate (BA), and 0.4 part by weight of vinyl-terminated polydimethylsiloxane (Vinyl-t-PDMS, Mw: 1000 g/mol) were added thereto. When the internal temperature of the reactor became 70° C., 0.02 part by weight of potassium peroxide (KPS) as an initiator and 0.020 part by weight of sodium formaldehyde sulfoxylate (SFS) were added to the monomer pre-emulsion while reacting for 3 hours. The core latex thus obtained was measured to have the total solid content (TSC) of about 35% and the latex particle size of 130 nm.

(Step 2) Preparation of Acrylic Processing Aid

To the core obtained in Step 1 in the reactor were added 0.25 part by weight of an emulsifier (SDBS), 48 parts by weight of methyl methacrylate (MMA), 11.4 parts by weight of BA and 0.6 part by weight of neopentyl glycol propoxylate diacrylate (NGPD, Mw: 320 g/mol) at once. When the internal temperature of the reactor became 45° C., 0.008 part by weight of t-butyl hydroperoxide (TBHP) as an initiator and 0.03 part by weight of sodium formaldehyde sulfoxylate (SFS) were added and reacted for 3 hours.

The latex thus obtained was measured to have the solid (TSC) of about 40% and the latex particle size of 155 nm.

The latex as prepared above was diluted to 15% on the solid basis, and the temperature of mixed latex was raised to 70° C. Then, 4 parts by weight of calcium chloride solution (10% by weight) was added at a time for the coagulation to give slurry. This slurry was washed twice or three times with ion exchanged water to get rid of by-products. Thereafter, the large amount of washing water was removed through filtration and the filtrate was dried for 3 hours at 80° C. using a compact fluidized-bed dryer which is used in a lab to prepare a core-shell acrylic processing aid in a form of powder.

Example 2

The acrylic processing aid was prepared according to the same procedure as Example 1 except that 48 parts by weight of methyl methacrylate, 10.8 parts by weight of butyl acrylate, and 1.2 parts by weight of neopentyl glycol propoxylate diacrylate (NGPD) were used in the preparation of shell in Step 2.

Example 3

The acrylic processing aid was prepared according to the same procedure as Example 1 except that 25 parts by weight of styrene, 14.2 parts by weight of butyl acrylate, and 0.8 part by weight of vinyl-terminated polydimethylsiloxane were used in the polymerization for preparing core in Step 1.

Example 4

The acrylic processing aid was prepared according to the same procedure as Example 1 except that the polymerization temperature was 40° C. and the content of initiator (TBHP) was 0.004 part by weight in the polymerization for preparing shell in Step 2.

Example 5

The acrylic processing aid was prepared according to the same procedure as Example 1 except that the polymerization temperature was 80° C. and the content of initiator (KPS) was 0.08 part by weight in the polymerization for preparing core in Step 1.

Example 6

The acrylic processing aid was prepared according to the same procedure as Example 1 except that the polymerization temperature was 83° C. and the content of initiator (KPS) was 0.30 part by weight in the polymerization for preparing core in Step 1.

Example 7

The acrylic processing aid was prepared according to the same procedure as Example 1 except that the polymerization temperature was 70° C. and the content of initiator (TBHP) was 0.020 part by weight in the polymerization for preparing shell in Step 2.

Example 8

The acrylic processing aid was prepared according to the same procedure as Example 1 except that 25 parts by weight of styrene, 10.0 parts by weight of butyl acrylate, and 5.0 part by weight of vinyl-terminated polydimethylsiloxane were used in the polymerization for preparing core in Step 1.

Comparative Example 1

The acrylic processing aid was prepared according to the same procedure as Example 1 except that 25 parts by weight of styrene and 15.0 parts by weight of butyl acrylate were used in the polymerization for preparing core in Step 1.

Comparative Example 2

The acrylic processing aid was prepared according to the same procedure as Example 1 except that 48 parts by weight of methyl methacrylate and 12.0 parts by weight of butyl acrylate, were used in the polymerization for preparing shell in Step 2.

Experiment 1

The specific viscosity of the acrylic processing aids prepared in Examples and Comparative Examples above was measured and shown in the following Table 1 along with the content of each ingredient.

The specific viscosity was obtained by dissolving 0.5 g of each powder sample of latex in 10 ml of THF solvent, measuring by an Ubbelohde viscometer, and calculating based on Equation 1 above.

In the following Table 1, SM means styrene, BA means butyl acrylate, V-PDMS means vinyl-terminated polydimethylsiloxane (Mw: 1000 g/mol), and NGPD means neopentyl glycol propoxylate diacrylate (Mw: 320 g/mol).

TABLE 1

| | | Composition (Part by Weight) | | | | | | | | | |
|---|---|---|---|---|---|---|---|---|---|---|---|
| | | Ex. 1 | Ex. 2 | Ex. 3 | Ex. 4 | Ex. 5 | Ex. 6 | Ex. 7 | Ex. 8 | Com. Ex. 1 | Com. Ex. 2 |
| Step 1 | SM | 25 | 25 | 25 | 25 | 25 | 25 | 25 | 25 | 25 | 25 |
| | BA | 14.6 | 14.6 | 14.2 | 14.6 | 14.6 | 14.6 | 14.6 | 10 | 15 | 14.6 |
| | V-PDMS | 0.4 | 0.4 | 0.8 | 0.4 | 0.4 | 0.4 | 0.4 | 5 | 0 | 0.4 |
| | Specific Viscosity (0.5~2.0) | 1.5 | 1.6 | 1.4 | 1.5 | 0.8 | 0.2 | 1.4 | 1.6 | 1.5 | 1.5 |
| Step 2 | MMA | 48 | 48 | 48 | 48 | 48 | 48 | 48 | 48 | 48 | 48 |
| | BA | 11.4 | 10.8 | 11.4 | 11.4 | 11.4 | 11.4 | 11.4 | 11.4 | 11.4 | 12 |
| | NGPD | 0.6 | 1.2 | 0.6 | 0.6 | 0.6 | 0.6 | 0.6 | 0.6 | 0.6 | 0 |
| | Specific Viscosity (2.0~8.0) | 4.5 | 4.6 | 4.4 | 5.5 | 4.6 | 4.3 | 1.7 | 4.7 | 4.5 | 4.5 |

Experiment 2

(1) Preparation of Vinyl Chloride Resin

The acrylic processing aid obtained in any of Examples and Comparative Examples and a vinyl chloride resin were mixed and a specimen was manufactured through a foaming process.

To 100 g of a vinyl chloride resin (LS080, LG Chem, Ltd.) were added 5.0 g of the complex stabilizer KD-105 (Dansuk Industrial Co., Ltd., a complex thermal stabilizer obtained by mixing uniformly a thermal stabilizer and a lubricant), 7 g of filler ($CaCO_3$), 2 g of $TiO_2$, and 0.2 g of the wax type lubricant AC316A. Then, 5 g of each of the acrylic processing aids obtained in Examples and Comparative Examples and 0.8 g of the foaming agent azodicarbonamide were added thereto. The mixture was warmed to 110° C. while mixing in a Henschel mixer whereby preparing the vinyl chloride resin composition comprising the acrylic processing aid.

(2) Measurement of Physical Properties (2-1) Analysis of Physical Properties after Foaming Process The vinyl chloride resin compositions obtained in Experiment 1 above were extruded at a slit die size of 2 mm (thickness)×30 mm (width) for 1 min from a Haake twin extruder under the cylinder temperature of 180° C. and the screw speed of 30 rpm. The extrusion output and the melt pressure were measured.

The extrudates were cut into 30 mm length and the foam density was measured using a plastic specific gravity meter. The high foam density means the low foaming magnitude, which shows the insufficient foaming characteristics. In addition, the cell uniformity was evaluated by observing the cross section of the molded foam using an optical microscope in the manner that the score is 5 when the foam cells are uniform, the score is 3 when the foam cells are not uniform a little bit, and the score is 1 when most foam cells are not uniform.

(2-2) Surface Characteristics

The surface state of the samples obtained in (2-1) above was observed and evaluated according to five (5) point method. The score is 5 when there is neither die mark nor flow mark on the surface and the thickness is uniform, the score is 3 when some die mark and flow mark are found and the thickness is not uniform, and the score is 1 when the die mark and flow mark are severe and the thickness is not uniform at all.

(2-3) Measurement of Fish Eye (Melt Globule not Dispersed)

The vinyl chloride resin compositions were prepared without adding a filler, which were then extruded from a 20 mm single screw extruder equipped with T-die under the cylinder temperature of 180° C. and the screw speed of 30 rpm to give films having the thickness of 0.2 mm. The number of fish eye in a defined region on the film surface was observed with the naked eye and evaluated in the manner that the score is 5 when there is few or no fish eye, the score is 3 when there are some fish eyes, and the score is 1 when there are many fish eyes.

(2-4) Evaluation of Adhesion

For the evaluation of adhesion, 100 g of polyvinyl chloride (Degree of Polymerization=800, LG Chem, Ltd., LS080), 3.0 g of Tin type stabilizer, and 0.9 g of calcium stearate (Ca-St) were introduced to a Henshel mixer at room temperature, and the mixture was warmed to 115° C. while mixing at 1,000 rpm. This mixture was cooled to 40° C. to complete the master batch. 3 g of sample was added thereto, and the resulting mixture was mixed again at room temperature. 100 g of the powder mixture was milled by using a 2-roll mill of 6 inches under the conditions of roll mixing temperature of 200° C., roll rotation number of 14×15 rpm, and roll gap of 0.3 mm for 4 min, and then the adhesion on the roll surface was evaluated. The evaluation was performed according to five point method based on the following criteria.

5: peeled with no elongation
4: peeled with little elongation
3: peeled with a little elongation
2: peeled with a lot of elongation
1: not peeled

TABLE 2

|  | Ex. 1 | Ex. 2 | Ex. 3 | Ex. 4 | Ex. 5 | Ex. 6 | Ex. 7 | Ex. 8 | Com. Ex. 1 | Com. Ex. 2 |
|---|---|---|---|---|---|---|---|---|---|---|
| Extrusion Output (g/min) | 62 | 66 | 63 | 64 | 65 | 63 | 63 | 63 | 61 | 56 |
| Foam Specific Gravity (g/cm$^3$) | 0.44 | 0.43 | 0.45 | 0.42 | 0.46 | 0.46 | 0.53 | 0.46 | 0.48 | 0.52 |
| Cell Uniformity | 5 | 5 | 4 | 5 | 5 | 5 | 2 | 4 | 4 | 3 |
| Surface Characteristics | 4 | 4 | 5 | 4 | 5 | 1 | 4 | 2 | 2 | 4 |
| Fish Eye | 4 | 5 | 4 | 5 | 4 | 2 | 4 | 1 | 2 | 5 |
| Adhesion | 5 | 4 | 5 | 5 | 4 | 1 | 3 | 1 | 1 | 4 |

<Appropriate Ranges of Physical Properties>
Extrusion Output (g/min) [60~70]
Foam Specific Gravity (g/cm$^3$) [0.4~0.5]
Cell Uniformity (five point method) [4~5]
Surface Characteristics (five point method) [4~5]
Globule (five point method) [4~5]
Adhesion (five point method) [4~5]

Referring to Table 2 above, the vinyl chloride resin composition prepared from the acrylic processing aid of the present invention can provide satisfactory results in all the physical properties including extrusion output, foam specific gravity, cell uniformity, surface characteristics, globule and adhesion.

In comparison to the above, however, the molded product of Comparative Example 1 showed some marks on the surface thereof with some fish eyes (a melt globule not dispersed) and poor adhesion due to the lack of V-PDMS in the core.

Also, the molded product of Comparative Example 2 which does not include NGPD in the shell showed good surface characteristics, globule, adhesion, etc., but poor results in terms of foam specific gravity and cell uniformity due to the insufficient function as a processing aid.

In addition, the specific viscosity of the copolymers constituting the core and shell may affect various physical properties including processability, surface characteristics, foaming characteristics, even though the copolymers have the same compositions as those of Examples.

Specifically, the molded products of Examples 6 and 7 were prepared to have the core and shell whose compositions were the same but their specific viscosity were different from those of Example 1. The molded product of Example 6 which had core specific viscosity lower than Example 1 showed lower surface characteristics and adhesion. The molded product of Example 7 which had shell specific viscosity lower than Example 1 showed a tendency that the foam specific gravity was higher and the cell uniformity was lower than those of Example 1.

The molded product of Example 8 wherein V-PMDS was excessively used in the core showed lower surface characteristics, development of globule and poor adhesion.

From the above results, it can be seen that the control of specific viscosity besides the restriction of composition of the core and shell is very important for securing the concurrent roles as a lubricant and a processing aid.

The acrylic processing aid of the present invention enables the manufacture of a molded product having excellent physical properties in case of preparing various molded products from a vinyl chloride resin.

What is claimed is:

1. An acrylic processing aid comprising
a core-shell structured acrylic latex,
wherein the core comprises a copolymer of an aromatic monomer, a C2-C18 alkyl acrylate monomer and a vinyl-terminated polydimethylsiloxane, and
the shell is grafted with said core and comprises a copolymer of methyl methacrylate, a C2-C18 alkyl acrylate monomer and a neopentyl glycol alkoxylate diacrylate.

2. The acrylic processing aid according to claim 1, wherein the specific viscosity ($\eta_{sp}$) of core is between 0.5 and 2.0, and the specific viscosity of shell is between 2 and 8.

3. The acrylic processing aid according to claim 1, wherein the core comprises 30 to 70% by weight of the aromatic monomer, 20 to 65% by weight of the C2-C18 alkyl acrylate monomer and 0.01 to 10% by weight of the vinyl-terminated polydimethylsiloxane based on 100% by weight of the total monomers forming the core.

4. The acrylic processing aid according to claim 1, wherein the aromatic monomer comprises one selected from the group consisting of styrene, alpha-methyl styrene, isopropenyl naphthalene, vinyl naphthalene, C1-C3 alkyl-substituted styrene, halogen-substituted styrene and combinations thereof.

5. The acrylic processing aid according to claim 1, wherein the C2-C18 alkyl acrylate comprises one selected from the group consisting of ethyl acrylate, propyl acrylate, butyl acrylate, 2-ethylhexyl acrylate, stearyl acrylate and combinations thereof.

6. The acrylic processing aid according to claim 1, wherein the vinyl-terminated polydimethylsiloxane is represented by the following formula 1:

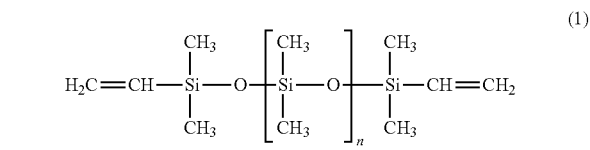

(In the above formula 1, n is an integer of 1 to 100.

7. The acrylic processing aid according to claim 1, wherein the vinyl-terminated polydimethylsiloxane has the weight average molecular weight of 200 to 250,000 g/mol.

8. The acrylic processing aid according to claim 1, wherein the shell comprises 45 to 90% by weight of methyl methacrylate, 1 to 50% by weight of the C2-C18 alkyl acrylate monomer, and 0.01 to 10% by weight of the neopentyl glycol alkoxylate diacrylate based on 100% by weight of the total monomers forming the shell.

9. The acrylic processing aid according to claim 1, wherein the neopentyl glycol alkoxylate diacrylate is represented by the following formula 2:

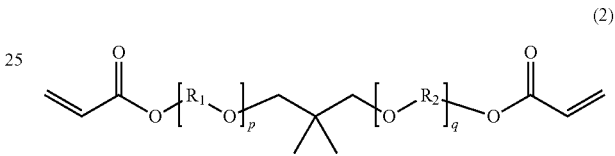

(In the above formula 2, $R_1$ and $R_2$ are the same as or different from each other and each are a C1-C4 alkylene group, and p+q is 2 to 5.

10. The acrylic processing aid according to claim 1, wherein the neopentyl glycol alkoxylate diacrylate is one or more selected from neopentyl glycol ethoxylate diacrylate, neopentyl glycol propoxylate diacrylate, and neopentyl glycol butoxylate diacrylate.

11. The acrylic processing aid according to claim 1, wherein the neopentyl glycol alkoxylate diacrylate has the weight average molecular weight of 200 to 10,000 g/mol.

12. The acrylic processing aid according to claim 1, wherein the acrylic processing aid comprises 5 to 50% by weight of core and 50 to 95% by weight of shell based on 100% by weight of the total monomers of the core and shell.

13. A method of preparing an acrylic processing aid, which comprises the steps of
copolymerizing an aromatic monomer, a C2-C18 alkyl acrylate monomer and a vinyl-terminated polydimethylsiloxane to prepare a core; and
adding methyl methacrylate, a C2-C18 alkyl acrylate monomer and a neopentyl glycol alkoxylate diacrylate to the core and carrying out graft polymerization to prepare a shell.

14. A vinyl chloride resin composition comprising the acrylic processing aid according to claim 1.

* * * * *